United States Patent [19]
Sahley

[11] 4,271,917
[45] Jun. 9, 1981

[54] LOCKING DEVICE FOR HARD METAL INSERTS

[75] Inventor: Lloyd W. Sahley, Mayfield Heights, Ohio

[73] Assignee: Syndrill Products Joint Venture, New York, N.Y.

[21] Appl. No.: 28,246

[22] Filed: Apr. 9, 1979

[51] Int. Cl.³ .......................................... E21B 10/52
[52] U.S. Cl. .................................. 175/410; 175/374; 175/413; 403/368; 403/374; 403/409
[58] Field of Search ...................... 175/374, 410, 413; 403/368, 374, 409

[56] References Cited

U.S. PATENT DOCUMENTS

| 1,578,901 | 3/1926 | McCaulley | 403/409 X |
| 2,107,835 | 2/1938 | Pierce | 403/374 X |
| 2,628,821 | 2/1953 | Alexander et al. | 175/418 X |
| 3,032,152 | 5/1962 | Titsler | 403/374 |
| 3,311,181 | 3/1967 | Fowler | 175/410 |
| 3,563,325 | 2/1971 | Miller | 175/410 |
| 3,599,737 | 8/1971 | Fischer | 175/410 |
| 3,749,190 | 7/1973 | Shipman | 175/410 |
| 3,974,621 | 8/1976 | Stang | 403/409 X |

FOREIGN PATENT DOCUMENTS 1211865  3/1966  Fed. Rep. of Germany .......... 403/374

Primary Examiner—James A. Leppink
Assistant Examiner—Richard E. Favreau
Attorney, Agent, or Firm—Yount & Tarolli

[57] ABSTRACT

A locking pin for sintered metal carbide inserts in tools adapted to work against hard mineral substances to minimize dislodgment of the inserts. The pin is generally cylindrical having a flat along a part of one side and circumferentially disposed ribs projecting therefrom. The pin is seated in a small bore alongside the socket in which the insert is press fitted, and is adapted to be deformed into locking engagement with the insert and with the sidewall of the bore which may be trepanned or undercut.

7 Claims, 8 Drawing Figures

LOCKING DEVICE FOR HARD METAL INSERTS

BACKGROUND OF THE INVENTION AND PRIOR ART

This invention relates to tools for comminuting a hard mineral formation such as rock, coal, pavement, etc. Such tools are generally characterized by hard metal inserts which are usually formed of a sintered metal carbide, for example, tungsten carbide, which inserts engage the mineral matter and provide a longer wear life than hardened steel. These inserts or compacts are normally press fitted into sockets bored into a hard steel tool head. The sockets are located according to a predetermined pattern. Typical examples of such tools include percussion drill bits, multi-rotary cutter rock drills, coal picks, and pavement breaking picks. Reference may be had to the patent to Klima U.S. Pat. No. 4,098,358, for details of one form of a rotary cutter rock drill in which the present invention is useful. Other forms of tools utilizing inserts or compacts in the working surface thereof are well known.

A common problem in the drilling of oil well and gas well holes with carbide insert containing multi-rotary cutter drill bits is the failure of the drill bit due to one or more of the tungsten carbide inserts coming loose or breaking out of its socket during the drilling process. This event usually results in several more of the tungsten carbide inserts breaking off the drill bit. The loose carbide insert is extremely hard and beyond the ability of the drill to disintegrate. Such a loosened insert is generally driven around the bottom of the drill hole as the drill rotates and until it is caught between rows of nibs which are rotating at the end of the bit. This frequently results in cracking or other destruction of several more of the carbide inserts.

Additionally, it has been found that the steel body of the rotary cutter as it works wears off a case hardened skin. This skin may be at a hardness of between 42-62 Rockwell C. The physical wear of the surface containing the tungsten carbide insert causes a decrease in the necessary retaining length or depth of the socket holding the shank of the carbide nib or insert. The inserts are normally pressed into the steel bodies with an interference "press fit" and no other retention means are used. The vibration and pounding action against the insert also tends to loosen and dislodge the insert from its socket in the body. Side loading due to the geometry of the insert may also accelerate loosening of the inserts from the rotary cutter bodies in rock drills.

With percussion drill bits, the problem is not as pronounced because most of the forces on the inserts are along the axis of the insert and the axis of the hole or socket holding the insert. In the manufacture of percussion bits and multi-rotary cutter bits, considerable manufacturing time is spent in sorting and measuring the reamed hole diameters in the bit bodies, and then matching the hole with the sized carbide inserts in order to achieve the correct interference fit. When inserts fall out of percussion type bits, it is usually because the matching of the insert to the socket has been badly carried out. Loss of an insert is less likely to be due to side loading while cutting through rock with a percussion type drill bit.

There has been provided a new locking device for holding the carbide insert into the working head of a tool for comminuting a hard mineral formation. Utilization of the structures of the present invention does not require a basic change in the design of the bits.

BRIEF STATEMENT OF THE INVENTION

Briefly stated, the present invention involves a tool having a hardened steel working head for comminuting a hard mineral formation and, more particularly, to a steel pin for locking a hard insert or nib into a socket in the working head and to a method of anchoring the carbide insert involving the use of such a pin. The locking pin is designed for disposition in a small bore drilled into the working head along an axis which is preferably aparallel to the axis of said socket and intersecting the socket at the entrance thereto. The pin, which lockingly engages both the carbide insert and the small bore, comprises a steel pin of generally cylindrical configuration having a lead end and an anvil end. One of the ends is deformable under impact in a radial direction to bring it into locked engagement with the bore, or a recess trepanned therein. The pin is provided with an axially extending relief formed along one side of the pin flared toward the axis of the pin from a point intermediate the lead end and the anvil end. The relief extends toward the lead end thereof, and facilitates entry of the pin into the small bore. In a preferred embodiment, the pin is characterized by a plurality of circumferentially spaced axially extending case hardened ribs extending from adjacent one of the ends toward the other end for deforming and lockingly engaging the side wall of the small bore in the hardened steel working head.

BRIEF DESCRIPTION OF THE DRAWINGS

The invention may be better understood by having reference to the annexed drawings which illustrate a preferred embodiment of the present invention and wherein.

DETAILED DESCRIPTION OF THE DRAWINGS

Figures 1, 2:
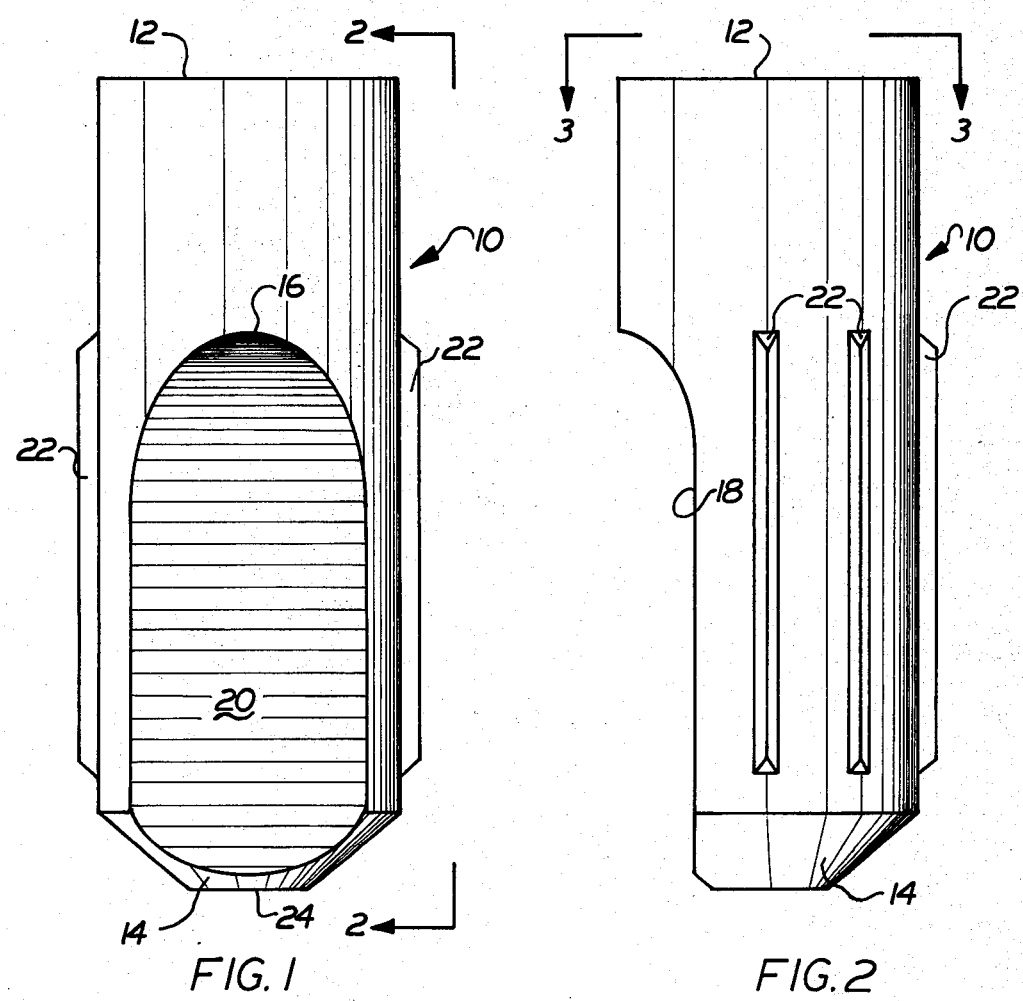
FIG. 1 is a front elevation on a much enlarged scale of a locking pin in accordance with the present invention.
FIG. 2 is a side elevation of the pin shown in FIG. 1 illustrating the contour of an axially extending relief.
Figure 3:
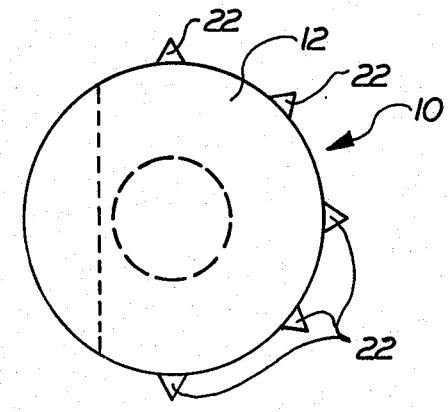
FIG. 3 is a top view of the pin shown in FIG. 1.

The locking pins of the present invention for most purposes are from about ⅛ of an inch to about ¼ of an inch in diameter and from ⅜-⅝ of an inch long. For clarity, the illustrations of FIGS. 1-3 are on a greatly enlarged scale. The locking pins are formed of a relatively soft, albeit hardenable, steel composition.

Referring now more particularly to FIGS. 1-3, there is here shown a locking device in accordance with the present invention. The locking device comprises a generally cylindrical body 10 having an anvil end 12 and a lead end 14. The anvil end 12 is adapted to be struck by a driving or impacting tool for the purpose of seating the pin 10 in a suitable small bore for locking engagement with the insert and with the small bore, as will be described below. The lead end 14 is adapted for guiding the pin 10 into the small bore. From a point 16 which is intermediate the anvil end 12 and the lead end 14, there is provided an axially extending relief 18 preferably having a flat surface 20 and extending from the initial point 16 toward the lead end 14. The purpose of the relief 18 is to reduce the cross-section of the pin for facilitating insertion into the small bore as described below.

The cylindrical body 10 is provided with a plurality of circumferentially disposed ribs 22 which extend axially of the body 10 and project therefrom as shown, for example, in FIG. 3. The ribs 22 project in a radial direction from the cylindrical wall of the body 10 and provide for an interference fit with the sidewalls of the small bore as described below. The ribs 22 are preferably carburizing location hardened by masking, and resist deformation when the pin is driven or pressed into the small bore. The ribs should be 50-64 Rockwell C, 59-62 Rockwell C being preferred. The head 12 of the pin may also be hardened to within the same range. However, from the surface 12 toward the intermediate portion of the pin, the metal is desirably soft enough to undergo deformation in a radial direction as will be described below. The lead end 14 is desirably tapered toward a smaller diameter extremity 24.

The locking pin of FIGS. 1-3 may be fed into the small bore by a conventional gun loader such as presently used to feed screws and mechanical parts on high production assembly lines. Such guns are readily adapted with a variety of guides for the purpose and for handling the locking pins of the configuration shown.

Referring now more particularly to FIGS. 4-8, there is here shown in sequence the manner in which the insert nib-tool working head assembly is prepared for receipt of the locking pin, and stepwise illustration of the insertion of the pin into locking engagement with the insert nib and the working head.

Figure 4:
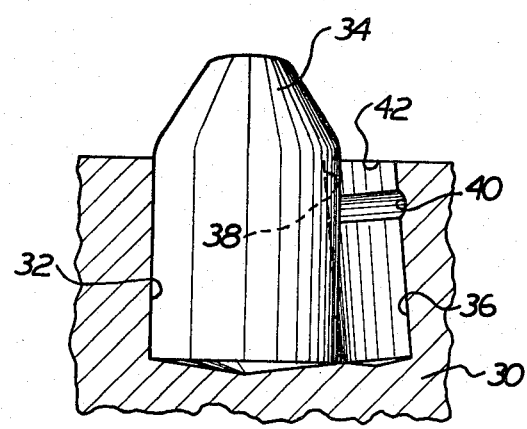
FIGS. 4, 5, 6, 7, and 8 illustrate in a progressive manner the mode of using the structure of the present invention and the interlocking relationship developed thereby.

In FIG. 4, there is shown a fragment of a common rotary cutter body 30 which rotary cutter is adapted for use in a multi-cone rock drill. The cone body 30 is provided with a bore 32 adapted to receive in an interference relationship therewith a sintered tungsten carbide compact 34 in accordance with usual practice. The tungsten carbide compact insert 34 illustrated in FIG. 4 is of the chisel shape, a shape which is normally subject to dislodgement to a greater extent than other configurations of such inserts, such as a hemispherical projecting nib.

To accommodate the locking pin 10 such as shown in FIGS. 1-3, there is provided a small bore 36 having diameter ranging from about ⅛ to ½ of the diameter of the sintered tungsten carbide insert 34. The small bore 36 is preferably drilled along an axis which lies in a plane including the axis of the sintered tungsten carbide insert 34, but which is slightly off parallel to the axis of the sintered tungsten carbide insert 34. As best shown in FIG. 4, the angle O ranges between about 1° and 5°, preferably about 3°. The small bore 36 may extend slightly into the body of the tungsten carbide insert 34 as shown at 38. The groove 38 in the insert 34 may be formed before insertion into the cone body 30 by milling or grinding the tungsten carbide insert.

In the preferred embodiment, the bore 36 is enlarged or trepanned as indicated at 40 to accept impact-deformed or displaced metal from the locking pin 10. It will be noted in this embodiment that the bore 36 intersects for at least part of its axial extent the bore 32, and that the locking pin 10 lockingly engages both the insert 34 and the body of the tool surrounding the small bore.

Figure 5:
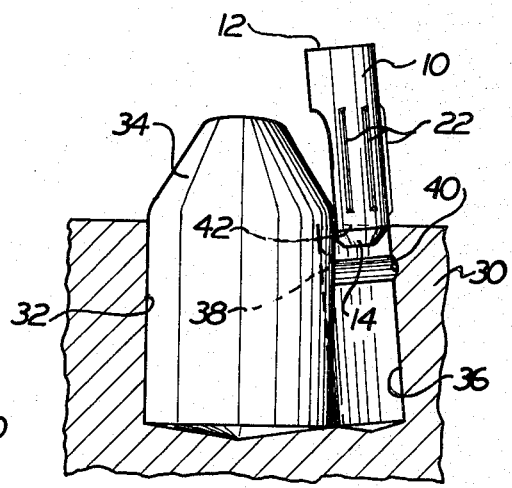
Figure 6:
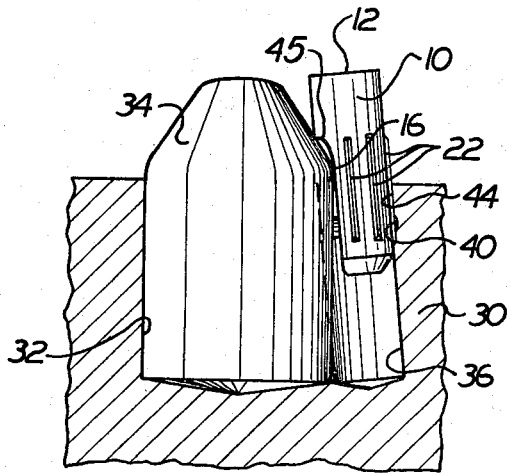

As best shown in FIG. 5, the pin 10 is moved into a position with the leading end 14 inserted in the opening 42 between the tungsten carbide insert nib 34 and the cone body 30. FIG. 6 shows the pin 10 driven about half way into the bore 36 by pressing or impacting against the anvil end 12 with a suitable tool, e.g., a hydraulic press, pneumatic hammer, or a hand held hammer. The ribs 22 engage the cone body 30, and cut grooves in the sidewll thereof as shown at 44 and stabilize the pin in a predetermined attitude. Simultaneously, the surface of the pin adjacent the intermediate point 16 engages the tungsten carbide insert 34 and is deformed thereby as indicated at 45.

Figure 7:
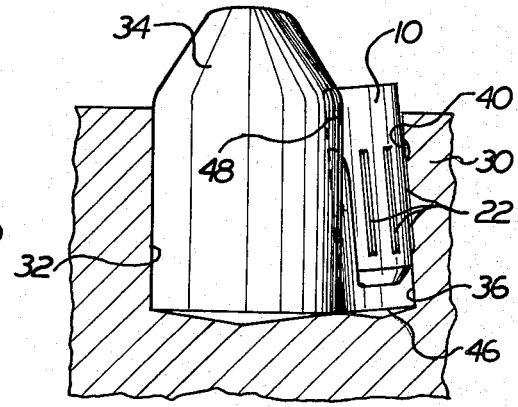

FIG. 7 shows the locking pin 10 almost seated in the bottom 46 of the small bore 36. Considerable deformation has occurred along the side 48, and the ribs 22 are nearly completely embedded in the cone body 30. It will be understood, of course, that some deformation of the ribs 22 will in all probability occur during driving of the pin into its fully seated position.

Figure 8:
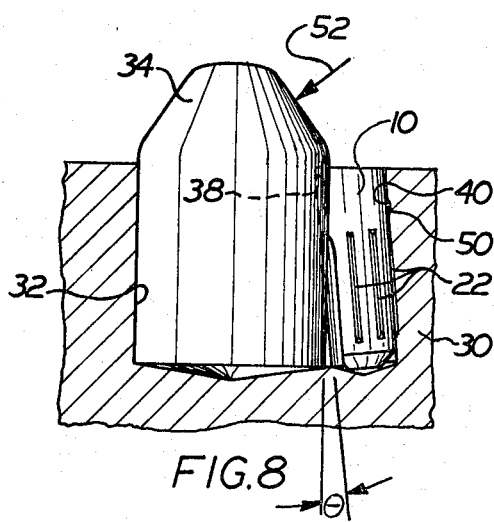

FIG. 8 shows the locking pin 10 in the fully inserted position, with a positive lock deformation 50 having occurred by radial movement of the softer metal of the pin body 10 into the trepanned groove 40.

As indicated above, the tungsten carbide insert 34 may be provided with a flat 38 ground along the line indicated by the lines 38 into the sidewll of the tungsten carbide insert 34. This will improve the positive locking of the device. Optionally, the tungsten carbide insert need not be ground and may retain its cylindrical form in the shank portion which extends into the recess or hole 32.

As indicated in FIG. 8, the locking pin is preferably located relative to the insert 34 so that the cutting forces engage the tungsten carbide insert 34 relative to the locking pin 10 in the manner indicated by the arrow 52.

The locking pins 10 of the present invention are desirably carburized entirely before hardening. Thereafter the surfaces of the ribs 22, the top surface, and the portion of the body immediately above the ribs as shown in FIG. 1 may be case hardened. The balance of the body is relatively soft having a hardness in the range of from 18 to 30 Rockwell C. A hardness of about 20 Rockwell C is preferred. These surfaces are decarburizd prior to insertion. The steel is soft, contains no lead, and is desirably chrome plated.

In an alternate embodiment, the small bore 36 may be undercut, as by rocking the drill, and the pin impact-deformed into a tapered hole 36. A locking effect similar to that of a trepanned groove is thereby obtained.

The beginning length of the locking pin 10 should exceed the depth of the small bore 36 by an amount at least sufficient to provide that when the final hammer blows are made on the anvil end 12, excess material such as shown in FIG. 7 will be driven into the small bore 36 and effect radial expansion of the pin body 10 into the groove 40 leaving the head 12 of the locking pin 10 substantially flush with the working head of the cone body 30.

The locking pins of the present invention provide a large side thrust against the body of the carbide inserts 34 and aid in correcting marginal interference fits between the inserts 34 and the holes 32. The locking action created by the angle $\theta$ prevents vertical movement of the insert 34 under heavy loads while chipping rock, for example, by virtue of the interference of the wedging material of the locking pin 10 as shown in FIG. 8. All forces encountered while cutting rock which tend to move the tungsten carbide insert 34 in an axial direction out of the hole 32 simultaneously increase the side pressure loading of the locking pin deformed material against the side of the tungstgen carbide insert 34.

In the case of a multi-cone bit body 30 using a locking pin 10 of the type shown in FIGS. 1-3 and an angle of insertion as shown in FIG. 4, consideration must be given to the normal rotation of the rotary cutter body 30. The normal rotation of the drill bit viewed from the ground level down toward the bit body is clockwise. The cutting forces against the face of the cone body cause the cone to rotate in a planetary manner opposite to the rotation of the drill pipe, and opposite to the rotation of the multi-cone bit body. The gouging action produces a force such as shown in FIG. 8 against the nose cone. A preferred location for the locking pin insert takes into account the forces on the tungsten carbide inserts 34 as mounted in the generally conically shaped rotary cutter bodies in a multi-cone drill bit. Desirably, the locking pin 6 is located radially relative to the insert 34 so that the cutting forces drive against the frusto-conical nose or carbide compact 34 and transmit the same force downward against the solid hole 32 surrounding the insert 34 in a direction radially opposite to the location of the pin 10. The locking pin 10 should not, for best results, be placed in a position directly opposite the cutting force line such as shown in FIG. 8 at 52.

As indicated above, the locking pins of the present invention have enabled somewhat greater latitude in the extent of the interference fit between the tungsten carbide insert 34 and the hole 32. Parts which were formerly unacceptable because of insufficient interference fit, now become acceptable parts. The locking devices of the present invention increase the compression load on the tungsten carbide inserts 34. This has the effect of increasing the transverse rupture shear strength of the tungsten carbide inserts enabling them to better withstand forces exerted on them during cutting. Increased life of the rotary cutter elements results.

It has also been found that when it is attempted to braze or solder or weld carbide compacts in their holes 32 to minimize loosening of the compacts therein, the cone body 30 is in fact softened and results in acceleration on the wear on the cone body 30 causing the carbide inserts 34 to fall out more rapidly than had the compact not been brazed in the first place. The heaviest losses of tungsten carbide compacts are experienced with the chisel-shaped inserts. The use of the locking pins of the present invention greatly reduces losses of the chisel-shaped tungsten carbide inserts. The life of the rotary cutter bodies on the drill bits is substantially increased when loss of the tungsten carbide inserts is prevented.

What is claimed is:

1. A steel pin for locking a hard metal insert into a socket in a hardened steel working head of a tool for comminuting a hard mineral formation and for disposition in a small bore drilled into said working head along side said socket and intersecting said socket at the entrance thereto, said pin comprising a steel pin of generally cylindrical configuration having a lead end and an anvil end, one of said ends being deformable under impact in a generally radial direction into locked engagement with said small bore, an axially extending relief formed along one side of said pin from a point intermediate said lead end and said anvil end and extending toward the lead end thereof whereby said lead end has a smaller cross-section than said anvil end to facilitate entry of said pin into said bore and a plurality of circumferentially spaced axially extending hardened ribs extending from adjacent one of said ends toward the other end for locking engagement with the side wall of said small bore in said hardened steel working head.

2. A steel pin as defined in claim 1 wherein the lead end is frusto-conically shaped.

3. A steel pin as defined in claim 1 wherein the hardness of the axial ribs is in the range of from 50 to 64 Rockwell C, and the body of the pin has a hardness of from 18 to 30 Rockwell C.

4. A steel pin as defined in claim 3 wherein the hardness of the anvil end is within the range of from 50 to 64 Rockwell C.

5. A tool having a hardened steel working head for comminuting a hard mineral formation and comprising a socket in said working head for receiving a sintered tungsten carbide insert, a small bore drilled into said working head along side said socket and intersecting the socket at the entrance thereto, a sintered tungsten carbide insert seated in said socket, and a locking pin coacting between said insert and said small bore to lock the said insert in place in said socket, said pin comprising a steel pin of generally cylindrical configuration and having a lead end and an anvil end, one of said ends being deformable under impact in a generally radial direction into locked engagement with said small bore, an axially extending relief formed along one side of said pin from a point intermediate said lead end and said anvil end and extending toward the lead end thereof whereby said lead end has a smaller cross section than said anvil end to facilitate entry of said pin into said bore and a plurality of circumferentially spaced axially extending hardened ribs extending from adjacent one of said ends toward the other end for locking engagement with the sidewall of said small bore in said hardened steel working head.

6. A tool as defined in claim 5 wherein the sintered tungsten carbide insert has a flat milled in one side thereof for disposition opposite said small bore whereby said pin when in said small bore engages the flat on said sintered tungsten carbide insert.

7. A tool as defined in claim 6 wherein the flat is milled at an angle to the axis of the insert.

* * * * *